Patented May 4, 1954

2,677,684

UNITED STATES PATENT OFFICE 2,677,684

5-HETEROCYCLIC AMINO DERIVATIVES OF BENZOPHENOXAZINE

Moses L. Crossley, Plainfield, Corris M. Hofmann, Bound Brook, and Paul F. Dreisbach, Somerville, N. J., assignors to American Cyanamid Company, New York, N. Y., a corporation of Maine No Drawing. Application February 23, 1952, Serial No. 273,154

11 Claims. (Cl. 260—244)

1

This invention relates to a new series of dyes which are 5-heterocyclic amino substituted benzophenoxazines, and is a continuation-in-part of copending application Serial No. 100,092 filed June 18, 1949, now abandoned.

The present invention is directed to a new group of dyestuffs which, in the form of their salts, range from blue to green, the free bases giving reddish colors in alcohol solution. The type formula of the new series in the form of its salts is as follows:

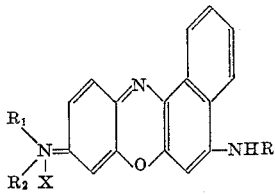

in which R is an aromatic heterocyclic radical, $R_1$ and $R_2$ are hydrogen or aliphatic radicals, and X is an anion. The structure is capable of resonating and the formula given corresponds to one of the two structures.

The dyestuffs may also exist in the form of the base for which the following formula is the most probable:

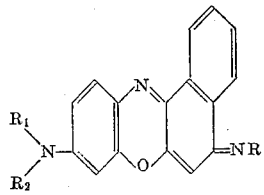

in which R is an aromatic heterocyclic radical and $R_1$ and $R_2$ are hydrogen or aliphatic radicals. Most of the members of the new series, however, are obtained more easily in the form of their salts in acid solution. These salts are addition salts with strong mineral acids, such as nitric, hydrochloric, hydrobromic, and the like. In most uses, the particular anion is immaterial, as the characteristics of the compound are determined primarily by the cation. Therefore, in practical use the nitrates or hydrochlorides are usually prepared, as these salts are the simplest and cheapest to make. It should be understood, however, that the invention is not limited to the hydrochlorides and nitrates, and the other salts are included.

In the specification and claims, the heterocyclic radical R may be defined as an unsaturated heterocyclic ring in which the bond from the 5-position of the benzophenoxazine ring is attached through the amino nitrogen to a nuclear carbon atom of the heterocyclic radical. The heterocyclic radical may contain nitrogen as its only heterocyclic element, for example, pyridine, pyrimidine, pyrazine, imidazol, quinoxaline, quinoline, pyrazole, isopyrazole, pyrrole, isoimidazol, pyridazine, etc., or the heterocyclic ring may contain sulfur in addition to nitrogen, for example, thiazole, benzothiazole, isothiazole, thiazine, thiadiazine, etc. Those compounds, the heterocyclic ring of which contain sulfur, are claimed in copending application, Serial No. 334,976, filed February 3, 1953.

The aliphatic amino group in the 9-position may be either a monoaliphatic or dialiphatic amino group. Among the most important dyestuffs are those in which the aliphatic group is a lower alkyl group, such as methyl, ethyl, propyl, isopropyl, butyl, sec. butyl, etc. Other alkyl groups, such as amyl, octyl, dodecyl or octadecyl may be attached to the 9-amino nitrogen as well as alkylene groups such as allyl, methallyl, oleyl, etc. In this specification and in the claims, the term aliphatic amino group will define a radical having the structure:

wherein $R_1$ is an aliphatic hydrocarbon chain and $R_2$ is either an aliphatic hydrocarbon chain or hydrogen.

The products of the present invention are useful as dyestuffs and biological stains and some of the members are active against certain bacteria, such as mycobacteria.

The products of the present invention may be produced by various processes, and it is not intended to limit them to any particular process of preparation. However, we have found that a very desirable process involves the reaction of an amino heterocyclic compound with a 9-dialkylaminobenzo[a]phenoxazonium salt, such as a chloride, nitrate, etc. In a more specific aspect of the present invention, this process is included.

For many staining uses, an alcoholic solution of the dyetuff is used, and in such cases it is frequently not necessary to isolate the purified product as a solid. When the dyestuffs are to be used in the form of solutions, a considerable saving in cost results with certain members which are difficult to obtain in the form of a pure solid without considerable losses of material. Substantial cost savings may thus be realized in many cases.

EXAMPLE 1

*5-(2'-pyridylamino)-9-dimethylaminobenzo[a]-phenoxazonium chloride*

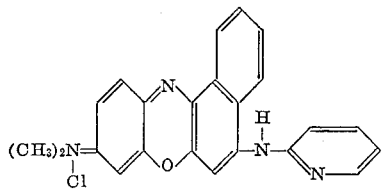

169 parts of 9-dimethylaminobenzo[a]phenoxazonium nitrate is dissolved in 1250 parts of ethyl alcohol with gentle warming. The mixture is then cooled to room temperature, and 141 parts of 2-aminopyridine added. The mixture, which originally was reddish blue color, changes to a greenish blue, and after stirring until the reaction appears completed, the mixture is allowed to stand overnight. A black solid separates and is recovered by filtration. The precipitate is then slurried in 1500 parts of ethanol and 100 parts of ammonium hydroxide added. The nitrate salt is converted into the free base, which separates as a reddish blue solid. The mixture is filtered, and the solid recovered. The precipitate is then slurried in 500 parts of ethanol, warmed gently, and treated with ten parts of 12 N, hydrochloric acid. The reddish blue color of the mixture changes to a deep greenish blue, and the chloride separates out as a black solid, which is filtered, washed with a small amount of ethanol and dried.

The dyestuff in faintly ammoniacal ethanol solution shows a maximum absorption of 531 m$\mu$. The maximum absorption of the acid ethanol solution is at 670 m$\mu$.

EXAMPLE 2

*5(2'-pyridylamino)-9-diethylaminobenzo[a]phenoxazonium chloride*

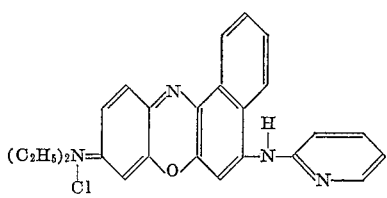

183 parts of 9-diethylaminobenzo[a]phenoxazonium nitrate is dissolved in 1250 parts of ethanol, with gentle warming. The mixture is then cooled to 38° C., and 141 parts of 2-aminopyridine are added. The solution changes from a red blue color to a deep blue. It is stirred occasionally until reaction appears complete and then allowed to stand overnight at room temperature. A super-saturated solution is produced, from which a solid precipitate is obtained in the usual manner. It is recovered by filtration as a shiny green solid. The precipitate is then slurried in 1000 parts of ethanol and 100 parts of ammonium hydroxide solution added. The mixture changes to a deep red color, and the solid is recovered by filtration.

The red solid is dissolved in 300 parts of glacial acetic acid and 87 parts of ethanol, saturated with hydrogen chloride, is added. The chloride of the dyestuff is precipitated by adding 1000 parts of diethyl ether and is recovered by filtration, washing the precipitate with small portions of ether. On drying at 55° C. the chloride is obtained as a green-black solid which can be purified by dissolving in ethanol and reprecipitating by dilution with benzene.

The maximum absorption of a faintly ammoniacal ethanol solution is at 542 m$\mu$, and that of a weakly acidic ethanol solution at 674 m$\mu$.

EXAMPLE 3

*5(2'-thiazolylamino)-9-diethylaminobenzo[a]phenoxazonium chloride*

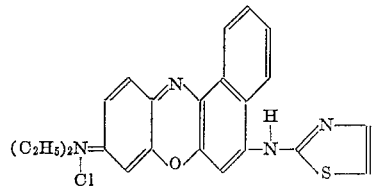

183 parts of 9-diethylaminobenzo[a]phenoxazonium nitrate is dissolved in 1250 parts of ethanol by gentle warming, cooled to slightly above room temperature, and 150 parts of 2-aminothiazole added. The solution gradually changes from a red blue color to a deep green blue color. It is stirred occasionally until reaction appears complete and is then allowed to stand overnight. A dark green solid precipitates which is recovered by filtration, slurried in 150 parts of warm ethanol and treated with 10 parts of ammonium hydroxide. The mixture changes to a deep red color and the solid is recovered by filtration. The precipitate is then slurried in 50 parts of warm ethanol and one part of 12 N. hydrochloric acid added. The chloride separates out as a dark green solid, is recovered by filtration and dried at 55° C.

If it is desired to purify the chloride obtained, it may be dissolved in 100 parts of hot aqueous alcoholic hydrochloric acid having the composition of one part water, one part alcohol and two parts of 12 N. hydrochloric acid.

The maximum absorption of a faintly ammoniacal ethanol solution of the dyestuff is at 572 m$\mu$.

EXAMPLE 4

*5(2'-pyrimidylamino)-9-diethylaminobenzo[a]phenoxazine*

The procedure of Example 3 is followed, substituting 14.3 parts of 2-aminopyrimidine for the 15 parts of 2-aminothiazole. The base obtained from the ammoniacal alcoholic slurry is recrystallized from hot ethanol, the purified product being obtained in the form of very dark needles having a green cast.

The maximum absorption of a faintly ammoniacal ethanol solution of the dyestuff is at 550 m$\mu$, and that of a weakly acidic ethanol solution at 663 m$\mu$.

EXAMPLE 5

*5(2'-pyrazinylamino)-9-diethylaminobenzo[a]phenoxazonium chloride*

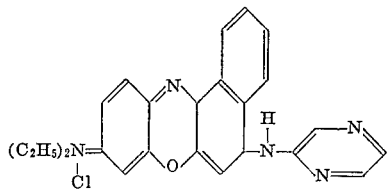

The procedure of Example 3 is followed, replacing the aminothiazole with 143 parts of 2- aminopyrazine. The free base is obtained as a deep red mixture, and on slurrying with 1000 parts of ethanol and 50 parts of concentrated hydrochloric acid the chloride is precipitated.

Further purification can be effected by again converting the chloride to the base with ammonium hydroxide and filtering, the base being much less soluble than the chloride and constituting a red black solid. One hundred parts of this purified dried base is then converted to the chloride by heating in 7000 parts of ethanol, to which 400 parts of ethanol saturated with hydrogen chloride have been added. The mixture is filtered hot and on cooling the chloride separates out as green crystals. They may be dried at 100° C. Alcohol and water solutions are deep blue in color, ammoniacal solutions red.

EXAMPLE 6

5[2'(4',6'-dimethylpyrimidyl) amino]-9-diethylaminobenzo[a]phenoxazonium chloride

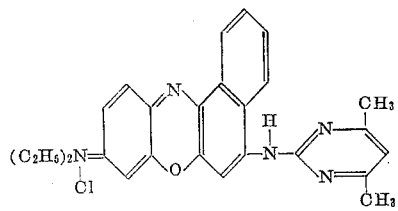

183 parts of 9-diethylaminobenzo[a]phenoxazonium nitrate is dissolved by warming in 1250 parts of ethanol. Two hundred parts of 2-amino-4,6-dimethylpyrimidine is added, the solution refluxed for about an hour and allowed to stand at room temperature for several days. A black solid precipitates out and is recovered by filtration. The precipitate is then slurried in 500 parts of ethanol and treated with 100 parts of ammonium hydroxide. A dark red solid base phecipitates out and can be converted into the chloride by slurrying in 300 parts of ethanol containing 50 parts of concentrated hydrochloric acid. The chloride is a dark blue black solid.

The chloride of the dyestuff dissolves in alcohol or water to give an intensely blue solution. The addition of ammonia changes the color to red.

EXAMPLE 7

5[2'(5' - chloropyrimidyl) amino] - 9 - diethylaminobenzo[a]phenoxazine

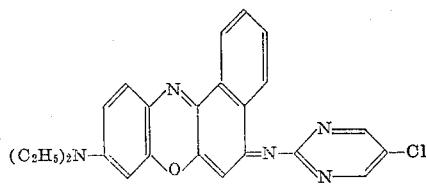

183 parts of 9-diethylaminobenzo[a]phenoxazonium nitrate dissolved in 1250 parts of ethanol with gentle warming. 194 parts of 5-chloro-2-aminopyrimidine is added and the solution allowed to stand until the reaction mixture changes into a thick mass. The mixture is then filtered and the precipitate slurried in 1000 parts of ethanol containing 100 parts of an ammonium hydroxide solution. A dark colored solid base precipitates, is recovered by filtration and transformed intothe chloride by slurrying with 1000 parts of ethanol containing 50 parts of concentrated hydrochloric acid. The black solid produced is filtered and dried.

The product is not quite pure and is purified by boiling in water and filtering. The filtrate can then be transformed into the base by adding 100 parts of ammonium hydroxide solution.

The dyestuff forms a red solution in ammoniacal alcohol and a blue solution in alcohol acidified with hydrochloric acid.

EXAMPLE 8

5[2'(4' - methylpyrimidyl) amino] - 9 - diethylaminobenzo[a]phenoxazonium chloride

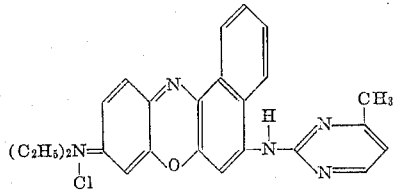

183 parts of 9-diethylaminobenzo[a]phenoxazonium nitrate is dissolved by warming in 1500 parts of ethanol. 164 parts of 2-amino-4-methylpyrimidine is added and the solution allowed to stand at room temperature for several days. A black solid precipitates out, which is recovered by filtration and is slurried in 500 parts of ethanol with 50 parts of ammonium hydroxide. The mixture is boiled for a short period of time, cooled and filtered, the base being obtained as a dark red solid. It can be transformed into the chloride by slurrying in 500 parts of ethanol containing 50 parts of concentrated hydrochloric acid. The chloride separates as a nearly black solid, which forms a deep blue solution in alcohol, turning to red when ammonia is added.

EXAMPLE 9

5 - (2' - quinolylamino) - 9 - diethylaminobenzo[a]phenoxazine base

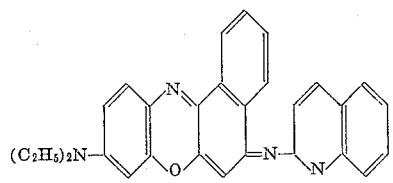

18 parts of 9-diethylaminobenzo[a]phenoxazonium nitrate is dissolved in 130 parts of ethanol, then 22 parts of 2-aminoquinoline is added and the solution is allowed to stand several hours. A green crystalline product separates. This green product is collected and converted to the base by warming in 100 parts of ethanol and 10 parts ammonium hydroxide solution, then cooling the mixture and isolating the crystalline base by filtration. This base dissolves in alcohol, giving a red solution which is changed to a green-blue color by adding hydrochloric acid. 16 parts of the base are obtained.

EXAMPLE 10

5 - (3' - quinolylamino) - 9 - diethylaminobenzo[a]phenoxazonium chloride

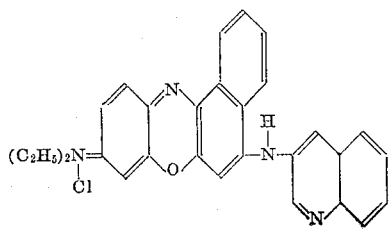

18 parts of 9-diethylaminobenzo[a]phenoxazonium nitrate is dissolved in 130 parts of ethanol, and then a solution containing 22 parts of 3-aminoquinoline dissolved in 200 parts of ethyl ethanol is added. This latter solution is prepared by adding 8 parts of sodium methylate to a warm mixture of 27 parts of 3-aminoquinoline hydrochloride in 200 parts of ethanol and filtering to remove the salt.

After the reaction mixture has stood for several days, it is filtered and the red-brown solid is slurried in 200 parts of water and 100 parts of ammonium hydroxide solution, and boiled. The mixture is filtered hot, and the black solid is then boiled in alcoholic ammonium hydroxide to insure complete conversion to the base. The base is then converted to the chloride by warming it in ethanol containing some concentrated hydrochloric acid. The mixture is cooled and filtered to isolate the chloride salt. This salt dissolves in alcohol, giving a blue solution which changes to red by adding ammonium hydroxide, and back to blue by adding hydrochloric acid.

EXAMPLE 11

*5-(4'-quinolylamino)-9-diethylaminobenzo-[a]phenoxazonium chloride*

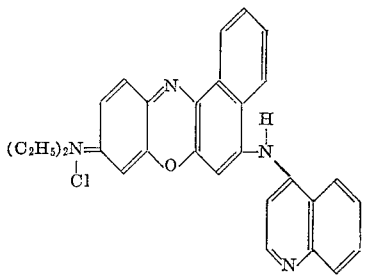

18 parts of 9-diethylaminobenzo[a]phenoxazonium nitrate is dissolved in 130 parts of ethanol, and then 22 parts of 4-aminoquinoline is added. The solution is boiled for a few minutes and then allowed to stand at room temperature for several days. The mixture is filtered, and the black solid is converted to the base by warming in 100 parts of ethanol with 10 parts of ammonium hydroxide solution. Conversion of the base to the chloride is done by treating the black solid base with alcoholic hydrochloric acid.

The salt dissolves in alcohol giving a blue solution, which is changed to red by adding ammonium hydroxide solution.

EXAMPLE 12

The procedure of Example 1 is followed, replacing the dimethylaminobenzo[a]phenoxazonium nitrate with a corresponding dipropylamino compound. The product obtained is a greenish black solid in the form of its chloride and is transformed into a red base on treatment with ammoniacal ethanol.

EXAMPLE 13

The procedure of Example 7 is followed, but the diethylaminobenzo[a]phenoxazonium nitrate is replaced by the corresponding dibutylamino compound. The dyestuff obtained in the form of its free base is a reddish solid which dissolves in ammoniacal alcohol to form a red solution. On acidification with hydrochloric acid the color is changed to a deep blue.

EXAMPLE 14

*9-di-n-butylaminobenzo[a]phenoxazonium nitrate*

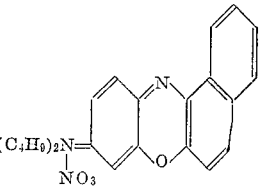

792 parts of beta naphthol, 5000 parts of ethyl alcohol and 415 parts of zinc chloride are refluxed together in a suitable reaction vessel. Then 1490 parts of p-nitroso di-n-butylaniline is added to the hot solution in small portions over a period of one hour. The reaction solution goes through a color change and finally becomes a purple color, with a crystalline product separating. The mixture is refluxed one hour longer and filtered hot, and the dark crystalline product is washed on the funnel with hot alcohol and then dried. This product (978 parts) is the chloride-zinc chloride double salt, which is converted to the nitrate salt by dissolving in 12 liters of boiling water, filtering the hot solution, cooling the filtrate and adding 6360 parts of 70% (sp. gr. 1.42) nitric acid. The nitrate salt separates as a black solid in a nearly quantitative yield. The product is isolated by filtration, and dried in the air.

EXAMPLE 15

*5(2'-pyridylamino)-9-di-n-butylaminobenzo-[a]phenoxazonium nitrate*

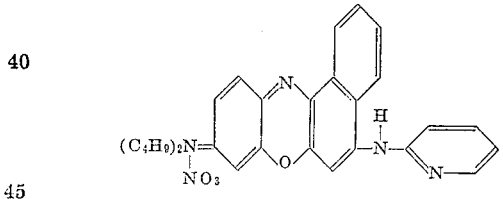

211 parts of 9-di-n-butylaminobenzo[a]phenoxazonium nitrate is dissolved in 1000 parts of warm ethyl alcohol, then 141 parts of 2-aminopyridine is added and the solution is warmed on a steam bath for 5 minutes. The color of the solution changes from a reddish-blue to a greenish-blue. After standing for several days at room temperature, the mixture is filtered and the green metallic crystalline product is dried. There is obtained 163 parts of crude product, which is recrystallized from 8000 parts of hot alcohol giving 137 parts of purified material. This product dissolves in alcohol, giving a blue solution, which changes to red by the addition of ammonia, and back to blue by the addition of hydrochloric acid.

EXAMPLE 16

*5-(2'-pyrimidylamino)-9-di-n-butylamino-benzo[a]phenoxazonium nitrate*

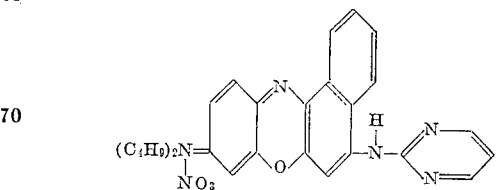

211 parts of 9-di-n-butylaminobenzo[a]phenoxazonium nitrate is dissolved in 1000 parts of warm ethyl alcohol, then 143 parts of 2-aminopyrimidine is added and the solution is warmed on a steam bath for 5 minutes. The color of the solution changes from a reddish-blue to a greenish-blue. After standing for several days at room temperature, the thick mixture is filtered, and the purple solid is dried. There is obtained 179 parts of a reddish purple solid product which can be purified from 1000 parts of hot alcohol giving 103 parts of purified product. This material dissolves in alcohol giving a blue solution which changes to red by the addition of ammonia and back to blue by the addition of hydrochloric acid.

EXAMPLE 17

9-di-n-propylaminobenzo[a]phenoxazonium nitrate

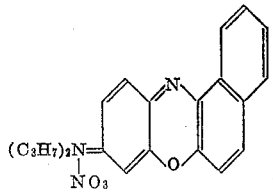

This is prepared in the same manner as 9-di-n-butylaminobenzo[a]phenoxazonium nitrate, substituting p-nitroso di-n-propylaniline in this case for the p-nitroso di-n-butylaniline.

EXAMPLE 18

5(2'-pyridylamino)-9-di-n-propylaminobenzo-[a]phenoxazonium nitrate

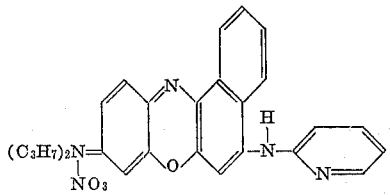

47 parts of 9-di-n-propylaminobenzo[a]phenoxazonium nitrate is dissolved in 250 parts of warm ethyl alcohol and then 34 parts of 2-aminopyridine is added, and the solution is warmed on the steam bath for 5 minutes. After standing at room temperature for several days, the mixture is filtered and the metallic green product is dried. There is obtained 44 parts of crude product which can be purified from 2000 parts of hot alcohol to give 33 parts of purified material. This green solid product dissolves in alcohol giving a blue solution, which changes to red by the addition of ammonia and back to blue by the addition of hydrochloric acid.

EXAMPLE 19

9-diethylamino-11-methylbenzo[a]phenoxazonium nitrate

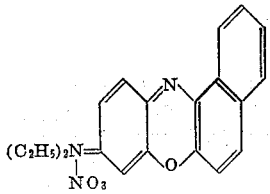

A solution of 720 parts of beta naphthol, 5000 parts of ethyl alcohol and 400 parts of zinc chloride is boiled in a suitable vessel, while 1140 parts of p-nitroso diethyl m-toluidine is added in small portions over a period of 5 hours. The reaction solution changes from yellow to brown to purple during the addition of the nitroso. After the nitroso compound has been added, the purple mixture is stirred one-half hour, filtered hot and the dark crystalline product is washed on the funnel with warm alcohol. There is obtained 718 parts of zinc chloride double salt which is converted to the nitrate salt by dissolving 600 parts of the zinc chloride salt in 40,000 parts of hot water, clarifying, cooling the filtrate and adding 2130 parts of nitric acid (sp. gr. 1.42). The nitrate separates as a nearly black solid.

There is obtained, after filtering and drying, 547 parts of the nitrate salt.

EXAMPLE 20

5(2'-thiazolylamino)-9-diethylamino-11-methylbenzo[a]phenoxazonium nitrate

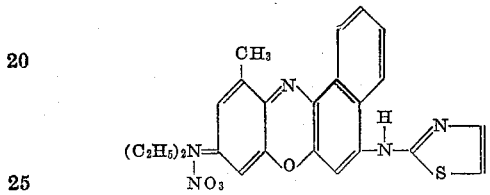

114 parts of 9-diethylamino-11-methylbenzo[a]phenoxazonium nitrate is dissolved in 1250 parts of warm ethyl alcohol, then 90 parts of 2-aminothiazole is added and the solution is warmed on a steam bath for a few minutes. The color changes from a reddish-blue to a greenish-blue. After standing a few hours, a thick mass forms, which is allowed to stand at room temperature for several hours to complete the reaction. By filtration the product is obtained as a green solid (46 parts) which can be purified by crystallization from 500 parts of hot ethyl alcohol to give 34 parts of the product as a brown solid. This solid dissolves in alcohol giving a purple solution which changes to yellow by adding ammonia and back to purple by adding hydrochloric acid.

EXAMPLE 21

5(2'-pyridylamino)-9-bis-(beta-hydroxyethyl)aminobenzo[a]phenoxazonium chloride-zinc chloride double salt

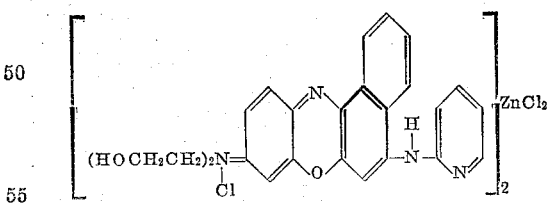

A solution of 132 parts of the zinc chloride double salt of 9-bis-(beta-hydroyethyl)aminobenzo[a]phenoxazonium chloride, 85 parts of 2-aminopyridine and 1000 parts of ethyl alcohol is warmed on a steam bath for 10 minutes. The color changes from deep red-blue to a green-blue. The solution is allowed to stand at room temperature about 24 hours, after which time some of the alcohol has evaporated and a dark colored oil has separated. Several volumes of water are added, with stirring, to solidfy the oil. The mixture is filtered, and the dark brown solid product is washed with water and then dried. About 152 parts of crude product is obtained which can be recrystallized from a large volume of hot alcohol. The purified product in acidified alcohol gives a blue solution which changes to red by addition of ammonia. An alcohol solution of this material shows maximum absorption peaks at wave lengths of 534 millimicrons and

EXAMPLE 22

5 - (2 - benzothiazolylamino) - 9 - di - n - propyl-aminobenzo[a]phenoxazonium nitrate

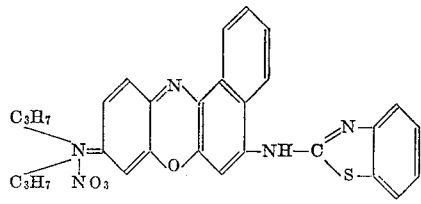

To 4.7 parts of 9-di-n-propylaminobenzo[a]-phenoxazonium nitrate, prepared as described in Example 17, are added 25 parts of ethyl alcohol and 5.4 parts of 2-aminobenzothiazole. The mixture is warmed gently for a few minutes to effect solution. After stirring, the solution is allowed to stand for about two days at room temperature in an open vessel during which time a solid separates. The material which precipitates is removed by filtration and purified by treatment with ethyl alcohol.

The purified dark-colored solid forms a blue solution in ethyl alcohol which changes to a green-blue color upon the addition of an alkaline reagent. An acidified alcohol solution of this product shows a maximum absorption at 690 mμ, measured spectrophotometrically. A slightly alkaline alcohol solution shows a maximum absorption at 593 mμ.

EXAMPLE 23

5 - (2 - benzimidazolylamino) - 9 - di-n-propyl-aminobenzo[a]phenoxazonium nitrate

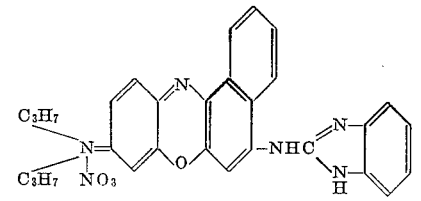

To 4.7 parts of 9-di-n-propylaminobenzo[a]-phenoxazonium nitrate, prepared as described in Example 17, are added 25 parts of ethyl alcohol and 4.8 parts of 2-aminobenzimidazole. The mixture is warmed gently until a solution is obtained. The solution is allowed to stand for several days at room temperature in an open vessel and the solid which precipitates is removed by filtration and purified by treatment with ethyl alcohol.

The purified dark solid obtained in this way forms a blue solution in ethyl alcohol, changing to red by the addition of an alkaline reagent. An acidified alcohol solution of this product shows absorption in the 600 to 640 mμ range. An alkaline alcohol solution of this solid shows maximum absorption in the 570 to 590 mμ range.

We claim:

1. Compounds having the formula:

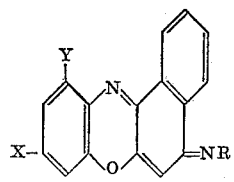

in which X is an N aliphatic hydrocarbon amino group of not more than 18 carbon atoms; Y is a substituent selected from the group consisting of hydrogen and lower alkyl radicals; and R is a heterocyclic radical, the heterocyclic ring of which contains nitrogen as its only heterocyclic element; and their acid addition salts.

2. The acid addition salt of a base having the formula:

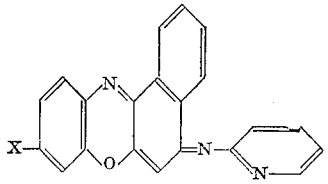

in which X is an N aliphatic hydrocarbon amino group of not more than 18 carbon atoms.

3. The acid addition salt of a base having the formula:

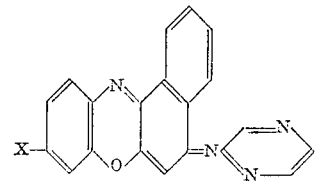

in which X is an N aliphatic hydrocarbon amino group of not more than 18 carbon atoms.

4. The acid addition salt of a base having the formula:

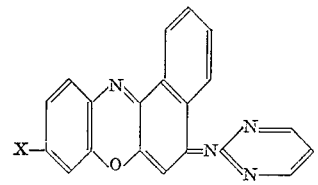

in which X is an N aliphatic hydrocarbon amino group of not more than 18 carbon atoms.

5. The acid addition salt of a base having the formula:

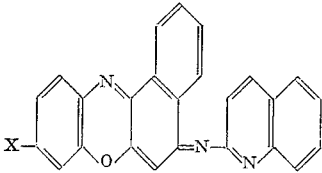

in which X is an N aliphatic hydrocarbon amino group of not more than 18 carbon atoms.

6. The acid addition salt of a base having the formula:

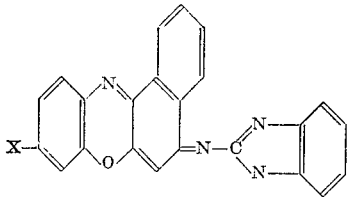

in which X is an N aliphatic hydrocarbon amino group of not more than 18 carbon atoms.

7. Compounds having the following formula:

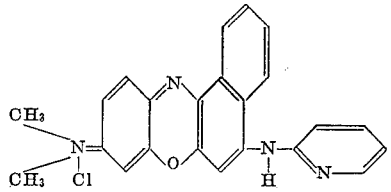

8. Compounds having the following formula:

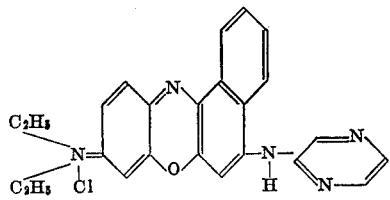

9. Compounds having the following formula:

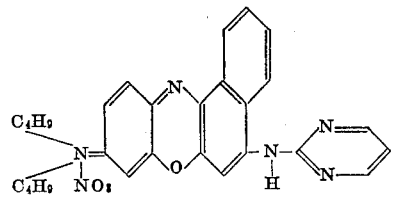

10. Compounds having the following formula:

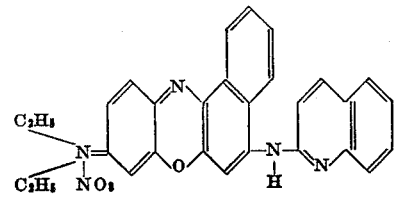

11. Compounds hacing the following formula:

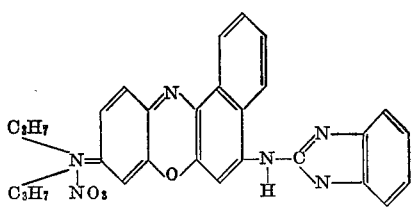

References Cited in the file of this patent

UNITED STATES PATENTS

| Number | Name | Date |
|---|---|---|
| 2,528,862 | Crossley et al. | Nov. 7, 1950 |
| 2,528,863 | Crossley et al. | Nov. 7, 1950 |

FOREIGN PATENTS

| Number | Country | Date |
|---|---|---|
| 488,945 | Germany | Jan. 25, 1930 |
| 556,773 | France | Apr. 19, 1923 |
| 630,707 | France | Aug. 27, 1927 |

OTHER REFERENCES

Sloviter: J. Am. Chem. Soc., vol. 71, pp. 3360-2 (1949).